April 21, 1953 G. W. HOOVER 2,636,161
DIRECTIONAL HORIZON INDICATING INSTRUMENT
Filed March 7, 1951

INVENTOR.
GEORGE W. HOOVER
BY
Roderick B. Jones
ATTORNEY

Patented Apr. 21, 1953

2,636,161

UNITED STATES PATENT OFFICE 2,636,161

DIRECTIONAL HORIZON INDICATING INSTRUMENT

George W. Hoover, Lincoln, Nebr.

Application March 7, 1951, Serial No. 214,400

12 Claims. (Cl. 340—27)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in directional horizon indicating instruments, and more particularly pertains to aircraft attitude indicating instruments that portray attitude with respect to the ground in terms of the attitude of a sphere suspended with three degrees of freedom with respect to the instrument face.

A single indicating instrument capable of giving both directional and attitude references through 360 degrees for all flight conditions is a desideratum in aeronautics. Heretofore, it has been conventional to crowd the instrument panel of aircraft further by using two separate instruments for determining the attitude and direction of the aircraft when in flight, the azimuth or directional indicator and the attitude indicator. These two reference indicators are so closely related in actual use that a pilot attempts to get simultaneous readings. This causes confusion and strain in getting a complete reference of the aircraft's attitude and direction with respect to the earth.

Contemporary faster aircraft demand instrument panel simplification to assure that safety in flight is not jeopardized by the pilot's attention being diverted from the field of vision longer than is reasonably necessary. While indicators providing attitude and directional reference in which some of the reference indications operate within limits are known, the present invention combines the full range of pitch, roll and turn information into a single presentation.

The primary object of the invention is to provide a single presentation instrument adapted to register direction, pitch and bank of an aircraft under all flight conditions.

Another object is to provide an instrument of the character described that simplifies interpretation by including a simulated pictorial horizon.

A further object is to provide an instrument of the character described that so introduces pitch, roll and turn information as to virtually eliminate the effect of vertigo while flying on instruments.

Still another object is to provide an instrument of the character described adapted to present a larger picture of attitude information than that possible with instruments of like general nature heretofore employed.

Another object is to provide an instrument of the character described having a horizon indication fixed in relation to the natural horizon and adapted for use for television or other suitable scanning to provide an enlarged horizon display.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
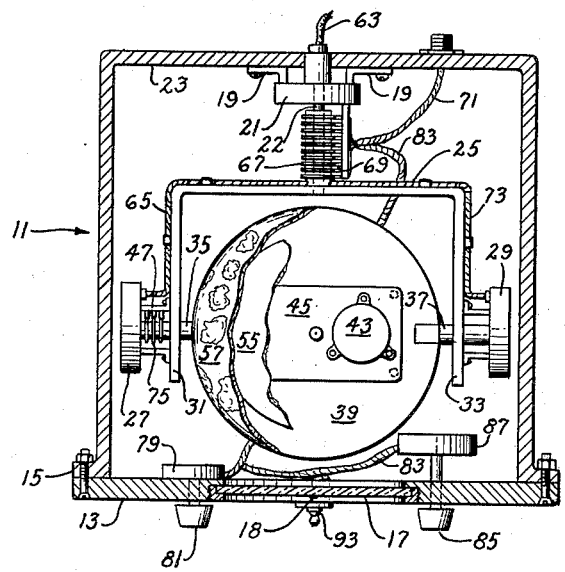
Fig. 1 is a cross section through the instrument case and the directional sphere, partly broken away to show the suspension of the various components, showing a preferred embodiment of the invention.
Figure 2:
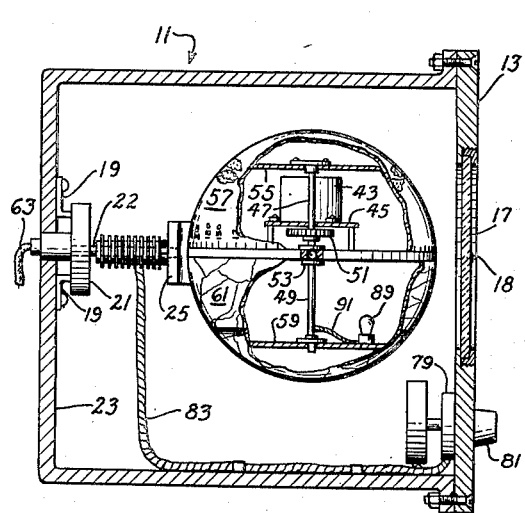
Fig. 2 is a side elevation of the instrument shown in Fig. 1, partly in section and partly broken away to show such suspension.
Figure 3:
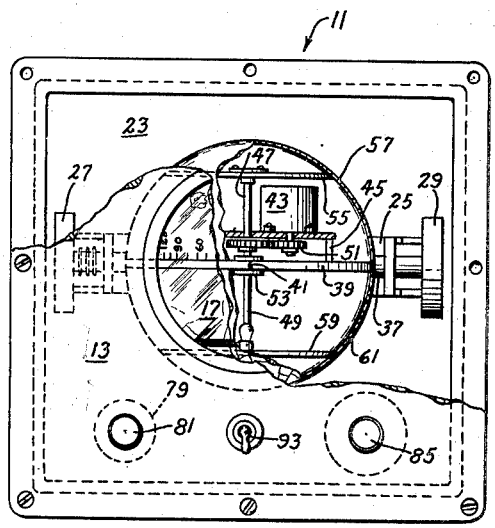
Fig. 3 is a front elevation thereof, sectioned and broken away in part to show such relations.

Instrument case 11 is provided with a face member 13 attached thereto, said case including an integral mounting flange 15 for securing the face member to the case and for attaching the instrument to an instrument panel (not shown). The face member 13 is provided with a viewing window 17. A suitable reference marker 18 can be inscribed on said window.

Brackets 19 mount a selsyn motor 21 on the rear wall 23 of the instrument case. Gimbal fork 25 is attached to and driven by said motor 21 through shaft 22, said gimbal fork being adapted to rotate on a fore and aft axis.

Selsyn motors 27 and 29 are attached respectively to the arms 31 and 33 of the gimbal fork 25. The respective shafts 35 and 37 of said motors carry a transparent disc or plate 39 which is rotatable thereby on a transverse axis. The periphery of said plate 39 defines the equator of the sphere hereinafter described, and is provided with a lubber line 41.

Selsyn motor 43 is mounted on plate 39 by means of bracket 45, the shafts 47 and 49 of said motor being driven on a vertical axis through gear train 51, said shaft 49 extending through a bearing 53 in the center of said plate. Shaft 47 carries plate 55, which mounts the northern hemisphere 57, and shaft 49 carries plate 59, which mounts the southern hemisphere 61. Hemisphere 57 is painted with a sky effect including a ring of clouds at the 45° latitude to aid in interpretation, and hemisphere 61 is painted with a landscape in perspective with a dark ring at the 45° latitude to aid similarly in orientation. In addition, a compass rose reading from 0° to 359° is engraved on the hemisphere 57 proximate the plate 39, said compass rose thus indicating heading by its relation to the index lubber line 41.

Selsyn motor 21 is coupled to the remote source of roll intelligence, a conventional roll sensing device, through conductor 63. Selsyn motor 27 is coupled to the remote source of pitch intelligence, a conventional pitch sensing device, through conductors carried in cable 65, slip rings 67 mounted on the shaft 22, brushes 69 and cable 71. Similarly, selsyn motor 29 is coupled to the means for parallax adjustment through conductors 73, slip rings 67, brushes 69 and cable 71. Selsyn motor 43 is coupled to the remote source of azimuth intelligence, such as a gyro-stabilized magnetic compass, successively through conductors led through shaft 35, slip rings 75, brushes 47, cable 65, slip rings 67, brushes 69 and cable 71.

Parallax adjustment between reference marker 18 and hemispheres 57 and 61 is afforded through a selsyn motor 79, which is mounted on the face member 13 and operated by control knob 81. Said selsyn motor 79 is coupled to selsyn 29 through cable 83 and selected brushes 69. Manipulation of control knob 81 thus offsets the sphere comprised of elements 57, 39 and 61 from the pitch alignment with the vertical gyro that drives selsyn motor 27.

For illumination of the sphere, control knob 85 is mounted on the face member 13 and is adapted to operate a rheostat 87 that is in the circuit of a light 89 carried on plate 59. Said rheostat is coupled to said light through selected conductors of cable 83 in the manner hereinabove described, and through conductor 91.

Another method of illumination comprises painting the sphere with a fluorescent paint that provides the light required to show the contrasts necessary for determining altitude when activated by ultraviolet light. The ultraviolet lighting source can be included in the instrument case or can be provided by an outside source. Alternatively, the light can comprise colored fluorescent paint superimposed on oil paint to provide the required pictorial indications when activated by a source of ultraviolet light.

A switch 93 carried on the face member 13 actuates a circuit through a branch of cable 83 that is adapted, when the circuit is closed, to cage the vertical gyro, locking said gyro in a vertical position.

The operation of the subject device in association with conventional aircraft attitude sensing installations provides a single presentation of attitude, including the factors of roll, pitch and turn.

Roll motion of the aircraft about the longitudinal axis causes the vertical gyro of the aircraft to be offset from the vertical position of the vertical gyro case, transmitting a signal from the vertical gyro selsyn to the selsyn motor 21, thus rotating the hemispheres 57 and 61, together with the plate 39, in the same angle of roll in the instrument case as the aircraft makes with the actual horizon.

The pitch motion of the aircraft about the lateral axis causes the vertical gyro to be offset from its vertical position within its case, actuating a selsyn which, in turn, actuates selsyn motor 29, thus simultaneously offsetting the two hemispheres 57 and 61, and the plate 39, from their vertical position with reference to the instrument case 11. Such elements thus are effective to indicate the same angle of pitch of the sphere with the case as the aircraft makes with the actual horizon.

Turn motion of the aircraft about its vertical axis causes the gyro-stabilized magnetic compass of the aircraft to be offset from its zero position with respect to its case and to actuate a selsyn which, in turn, actuates selsyn motor 43, rotating simultaneously the hemispheres 57 and 61 with reference to the plate 39, thus indicating the heading of the aircraft.

The many advantages of this instrument are evident. There is combined in a single presentation, in a single integrated instrument, the information heretofore indicated by two separate and distinct instruments. Accordingly, this instrument reduces the amount of eye movement required by the pilot to obtain all of the information required to determine the attitude of the aircraft, thus reducing strain, fatigue and the likelihood of confusion in interpretation. Additionally, the device simulates the flight conditions with respect to the attitude in pictorial form, a medium that is easier for a pilot to interpret than the conventional simulated type of presentation.

Obviously many modifications and variations of the present invention are possible in the light of the above teachings. It is therefore to be understood that within the scope of the appended claims the invention may be practiced otherwise than as specifically described.

I claim:

In an aircraft having an instrument panel and roll, pitch and turn sensing devices, an attitude indicating instrument comprising an instrument case having a viewing window adapted to be mounted on such panel, a sphere comprising a disc and upper and lower hemispheres rotatable relative said disc suspended in said case, and means responsive to said sensing devices to rotate said sphere with three degrees of freedom with respect to said window.

2. In an aircraft having an instrument panel and roll, pitch and turn sensing devices, an attitude indicating instrument comprising an instrument case having a viewing window adapted to be mounted on such panel, a sphere comprising a disc and upper and lower hemispheres rotatable relative said disc suspended in said case, means responsive to said roll and pitch sensing devices to rotate said sphere on its roll and pitch axes, and means responsive to said turn sensing device to rotate said hemispheres relative said disc.

3. In an aircraft having an instrument panel and roll, pitch and turn sensing devices, an attitude indicating instrument comprising an instrument case having a viewing window adapted to be mounted on such panel, a sphere comprising a disc and upper and lower hemispheres rotatable relative said disc suspended in said case, means responsive to said roll and pitch axes, and means responsive to said turn sensing device to rotates said hemispheres relative said disc.

4. In an aircraft having an instrument panel and roll, pitch and turn sensing devices, an attitude indicating instrument comprising an instrument case having a viewing window adapted to be mounted in such panel, a sphere comprising a disc and upper and lower hemispheres rotatable relative said disc suspended in said case, means responsive to said roll and pitch sensing devices to rotate said disc on its roll and pitch axes, and means mounted on said disc responsive to said turn sensing device to rotate said hemispheres relative said disc.

5. In an aircraft having an instrument panel and roll, pitch and turn sensing devices, an attitude indicating instrument comprising an instrument case having a viewing window adapted to be mounted on such panel, a sphere comprising a disc and upper and lower hemispheres rotatable relative said disc, a gimbal fork journaled in said case for rotation on a fore and aft or roll axis, said disc being carried by said fork and being rotatable thereon on a transverse or pitch axis, means responsive to said roll and pitch sensing devices to rotate said disc on its roll and pitch axes, and means mounted on said disc responsive to said turn sensing device to rotate said hemispheres relative said disc.

6. In an aircraft having an instrument panel and roll, pitch and turn sensing devices, an attitude indicating instrument comprising an instrument case having a viewing window adapted to be mounted on such panel, a sphere comprising a disc and upper and lower hemispheres rotatable relative said disc, a gimbal fork journaled in said case for rotation on a fore and aft or roll axis, said disc being carried by said fork and being rotatable thereon on a transverce or pitch axis, a first selsyn motor responsive to said roll sensing device to rotate said disc on its roll axis, a second selsyn motor responsive to said pitch sensing device to rotate said disc on its pitch axis, and a third selsyn motor mounted on said disc and responsive to said turn sensing device to rotate said hemispheres relative said disc.

7. In an aircraft having an instrument panel and roll, pitch and turn sensing devices, an attitude indicating instrument comprising an instrument case having a viewing window adapted to be mounted on such panel, a sphere representing the earth and comprising a disc and upper and lower hemispheres rotatable relative said disc, a lubber line inscribed on the periphery of said disc, indicia of azimuth inscribed on the periphery of one of said hemispheres proximate the edge thereof adjacent said disc, a gimbal fork journaled in said case for rotation on a fore and aft or roll axis, said disc being carried by said fork and being rotatable thereon on a transverse or pitch axis, a first selsyn motor responsive to said roll sensing device to rotate said disc on its roll axis, a second selsyn motor responsive to said pitch sensing device to rotate said disc on its pitch axis, and a third selsyn motor mounted on said disc and responsive to said turn sensing device to rotate said hemispheres relative said disc.

8. In an aircraft having an instrument panel and roll, pitch and turn sensing devices, an attitude indicating instrument comprising an instrument case having a viewing window adapted to be mounted on such panel, a reference marker inscribed on said window, a sphere representing the earth and comprising a disc and upper and lower hemispheres rotatable relative said disc, a lubber line inscribed on the periphery of said disc, indicia of azimuth inscribed on the periphery of one of said hemispheres proximate the edge thereof adjacent said disc, a gimbal fork journaled in said case for rotation on a fore and aft or roll axis, said disc being carried by said fork and being rotatable thereon on a transverse or pitch axis, a first selsyn motor responsive to said roll sensing device to rotate said disc on its roll axis, a second selsyn motor responsive to said pitch sensing device to rotate said disc on its pitch axis, and a third selsyn motor mounted on said disc and responsive to said turn sensing device to rotate said hemispheres relative said disc.

9. In an aircraft having an instrument panel and roll, pitch and turn sensing devices, an attitude indicating instrument comprising an instrument case having a viewing window adapted to be mounted on such panel, a sphere comprising a disc, a bearing in the center of said disc carrying a shaft normal to the plane of said disc, and a pair of hemispheres mounted on said shaft for rotation relative said disc, a gimbal fork journaled in said case for rotation on a fore and aft or roll axis, said disc being carried by said fork and being rotatable thereon on a transverse or pitch axis, means responsive to said roll and pitch sensing devices to rotate said disc on its roll and pitch axes, and means mounted on said disc responsive to said turn sensing device to rotate said hemispheres relative said disc.

10. In an aircraft having an instrument panel and roll, pitch and turn sensing devices, an attitude indicating instrument comprising an instrument case having a viewing window adapted to be mounted on such panel, a sphere comprising a disc, a bearing in the center of said disc, a pair of shafts carried by said bearing normal to and respectively above and below the plane of said disc, and having a hemisphere mounted on each of said shafts for rotation relative said disc, a gimbal fork journaled in said case for rotation on a fore and aft or roll axis, said disc being carried by said fork and being rotatable thereon on a transverse or pitch axis, means responsive to said roll and pitch sensing devices to rotate said disc on its roll and pitch axes, and means mounted on said disc responsive to said turn sensing device to rotate said hemispheres relative said disc.

11. In an aircraft having an instrument panel and roll, pitch and turn sensing devices, an attitude indicating instrument comprising an instrument case having a viewing window adapted to be mounted on such panel, a sphere comprising a disc and upper and lower hemispheres rotatable relative said disc, a gimbal fork journaled in said case for rotation on a fore and aft or roll axis, said disc being carried by shafts in the arms of said fork and being rotatable thereon on a transverse or pitch axis, a first selsyn motor responsive to said roll sensing device to rotate said disc on its roll axis, a second selsyn motor responsive to said pitch sensing device to rotate said disc on its pitch axis, and a third selsyn motor mounted on said disc, coupled to said turn sensing device by conductors passing through said disc and one of said shafts to rotate said hemispheres relative said disc.

12. In an aircraft having an instrument panel and roll, pitch and turn sensing device, an attitude indicating instrument comprising an instrument case having a viewing window adapted to be mounted on such panel, a sphere comprising a disc and upper and lower hemispheres rotatable relative said disc, a gimbal fork carried on first shaft journaled in said case for rotation on a fore and aft or roll axis, said disc being carried by shafts in the arms of said fork and being rotatable thereon on a transverse or pitch axis, a first selsyn motor coupled to said roll sensing device to rotate said disc on its roll axis, a second selsyn motor coupled to said pitch sensing device through conductors carried by one of said arms, slip rings carried on said first shaft and brushes in engagement with said slip rings to rotate said disc on its pitch axis, and a third selsyn motor mounted on said disc, coupled to said turn sensing device by conductors passing through said disc, one of the shafts in said arms, slip rings thereon, brushes in engagement therewith, conductors carried by one of said arms, slip rings carried on said first shaft and brushes in engagement therewith to rotate said hemispheres relative said disc.

GEORGE W. HOOVER.

References Cited in the file of this patent

UNITED STATES PATENTS

| Number | Name | Date |
|---|---|---|
| 1,612,117 | Hewlett, et al. | Dec. 23, 1926 |
| 2,080,490 | Kollsman | May 18, 1937 |
| 2,260,396 | Otto, Jr. | Oct. 28, 1941 |
| 2,582,796 | Reid | Jan. 15, 1952 |